US011953033B2

(12) United States Patent
Bueter

(10) Patent No.: US 11,953,033 B2
(45) Date of Patent: Apr. 9, 2024

(54) WORKING CYLINDER WITH CUSHIONED END-STROKE

(71) Applicant: BUEMACH ENGINEERING INTERNATIONAL B. V., Emmen (NL)

(72) Inventor: Josef Bueter, Haren/Altenberge (DE)

(73) Assignee: Buemach Engineering International B.V., Ta Emmen (NL)

( * ) Notice: Subject to any disclaimer, the term of this patent is extended or adjusted under 35 U.S.C. 154(b) by 64 days.

(21) Appl. No.: 17/787,675

(22) PCT Filed: Dec. 18, 2020

(86) PCT No.: PCT/DE2020/000339
§ 371 (c)(1),
(2) Date: Jun. 21, 2022

(87) PCT Pub. No.: WO2021/129900
PCT Pub. Date: Jul. 1, 2021

(65) Prior Publication Data

US 2023/0011362 A1 Jan. 12, 2023

(30) Foreign Application Priority Data

Dec. 23, 2019 (DE) ..................... 20 2019 005 218.6

(51) Int. Cl.
*F15B 15/22* (2006.01)
*F15B 15/14* (2006.01)

(52) U.S. Cl.
CPC ........ *F15B 15/224* (2013.01); *F15B 15/1452* (2013.01)

(58) Field of Classification Search
CPC ...... F15B 15/22; F15B 15/222; F15B 15/223; F15B 15/224; F15B 15/1452
See application file for complete search history.

(56) References Cited

U.S. PATENT DOCUMENTS 3,592,106 A * 7/1971 Baughman ............... F16J 10/02
92/85 B
3,626,812 A * 12/1971 Trick ....................... F16J 10/02
92/85 B (Continued)

FOREIGN PATENT DOCUMENTS

| | | |
|---|---|---|
| EP | 0949422 B1 | 9/2001 |
| JP | H0650306 A | 2/1994 |
| JP | 2017015108 A | 1/2017 |

*Primary Examiner* — Dustin T Nguyen
(74) *Attorney, Agent, or Firm* — Laurence A. Greenberg; Werner H. Stemer; Ralph E. Locher

(57) ABSTRACT

A working cylinder has a cushioned end-stroke. The piston unit has a piston main part and a ring body. The exterior of the ring body receives a piston ring with a piston ring gap, and the ring opening of the ring body receives a guiding pin of the piston main part. A ring gap is formed between the ring body and the guiding pin, and the ring body has axial and radial play relative to the piston main part. The ring body has an axial ring surface on the piston main part side, and the piston main part has an axial counter ring surface on the ring body side opposite the axial ring surface. The piston unit is constructed so that during an inward movement into the cushioning zone, the piston ring passes axially over the pressure medium connection and the piston unit encloses a damping pressure medium volume. The piston unit is in a first operating state during an inward movement and a second operating state during an outward movement. In the first operating state, the axial ring surface and the axial counter ring surface lie against each other and define a seal plane the piston ring gap is configured for a throttled outflow of the damping pressure medium volume. In the second operating state, the axial ring surface and the axial counter ring surface have an axial gap for a pressure medium inflow.

6 Claims, 7 Drawing Sheets

(56) References Cited

U.S. PATENT DOCUMENTS

| | | | | |
|---|---|---|---|---|
| 4,048,905 | A | 9/1977 | Souslin | |
| 4,089,251 | A * | 5/1978 | Louviot | F15B 15/224 91/29 |
| 4,207,800 | A * | 6/1980 | Homuth | F15B 15/224 91/409 |
| 6,047,627 | A | 4/2000 | Bueter | |
| 6,186,043 | B1 * | 2/2001 | Callies | F15B 15/224 91/422 |
| 10,024,344 | B2 * | 7/2018 | Ognibene | F15B 15/1452 |
| 10,451,093 | B2 * | 10/2019 | Kobayashi | F15B 15/222 |

* cited by examiner

WORKING CYLINDER WITH CUSHIONED END-STROKE

FIELD AND BACKGROUND OF THE INVENTION

The invention relates to a working cylinder with cushioned end-stroke.

Solutions in different variations which, in a defined range, constantly or progressively slow down the movement of a piston within a hydraulic working cylinder are known from the prior art. Usually, the movement is slowed down by throttling the outflow of the hydraulic fluid using a damping element. This damping element reduces the cross-section via which the hydraulic fluid can flow out.

For example, EP 0 949 422 B1 discloses a solution in which a ring gap of a damping ring, which rests resiliently against the inner cylinder wall, functions as a flow-limiting constriction. The damping zone of the cylinder has a conical design for a progressive damping effect. Thus, the damping ring is compressed and the ring gap of the damping ring is progressively reduced with the progressive movement in the damping zone. On the one hand, this is a proven solution that makes an important contribution to the state of the art but, on the other hand, its production is technologically very demanding because of the required precision of the gap dimension of the piston and the inner cylinder wall.

One problem of the state of the art is caused by buckling loads since these lead to deformations in the guides of the guide closure part and in the guide bands of the piston and require a relatively big gap size between the piston and the inner cylinder wall to ensure that the piston does not rub against the inner cylinder wall. And this is in conflict with the provision of a most accurate damping effect.

SUMMARY OF THE INVENTION

The task of the invention is to disclose a damping system for a working cylinder with cushioned end-stroke, which provides high precision and easy adjustment of damping, is also suitable for high bending stresses on the piston unit and for different cylinder designs, has a high level of robustness and operational reliability, and, moreover, can be manufactured in a simple and cost-efficient manner.

The task is solved by the features specified in the independent claim. Preferred further embodiments result from the sub-claims.

According to the invention, the working cylinder with cushioned end-stroke comprises a cylinder and a piston unit.

The cylinder according to the invention, includes a cylinder tube, a first closure part, and a second closure part.

According to the invention, the first closure part is arranged at the first cylinder tube end and the second closure part is arranged at the second cylinder tube end of the cylinder tube. The two closure parts are arranged such that they are connected to the respective cylinder tube ends in a pressure-tight manner. To provide such a connection, each of the two closure parts is preferably welded to the cylinder tube along the common circumferential contact surface. Other connections, for example, screw joints, are also possible.

The cylinder tube and the closure parts form a cylinder interior according to the invention. The cylinder interior is to be understood to be the interior space of the cylinder which is formed by the closure parts and the cylinder tube and in which the pressure medium is located when the system is used as intended. Further, the piston is arranged in the cylinder interior.

According to the invention, the cylinder has a damping zone in at least one end region. The damping zone is the area of the cylinder interior in which damping (cushioning effect) takes place when the piston unit moves in.

Damping is understood to be a force that slows down the movement of the piston unit.

The damping zone is located in at least one end region of the cylinder tube and comprises the part of the cylinder interior between a pressure medium connection and an axial boundary achieved by the closure part that is arranged at this end region.

According to the invention, the cylinder has a laterally arranged pressure medium connection, and the pressure medium connection is assigned to the damping zone and axially spaced from the axial boundary of the cylinder interior.

The damping zone extends between the pressure medium connection and the axial boundary. The axial boundary physically blocks the further movement of the piston unit and thus axially defines the maximum movement path of the piston unit at one side.

The axial boundary is preferably formed by the closure part. For this purpose, the closure part has an appropriate stop surface against which the piston unit may rest so that it assumes its end position.

In special designs, the end position of the piston unit in operation can also be located before the axial boundary is reached.

According to the invention, the piston unit has a piston main part and a ring body. Preferably, the piston unit is composed of a piston rod and a piston, and the piston comprises the piston main part and the ring body. Hereinafter, the piston main part and the ring body are also referred to collectively as the piston.

Depending on the type of the working cylinder, the piston main part can have different designs. For example, the piston rod may be guided completely through or only partially into the piston main part. Further, the piston unit may be designed as a monolithic component and then it may have only a piston rod section and a piston section.

According to the invention, the piston unit slidably passes through the first closure part and forms at least one working chamber in the cylinder interior.

The first closure part is designed to receive the piston unit in a sliding manner and has sealing elements and guides for this purpose.

According to the invention, the piston main part is guided by means of a guide in the cylinder interior in such a manner that it is axially displaceable.

In this design, the piston main part has at least one receiving section for a guide. The receiving section is preferably designed as a groove in which a guide ring is inserted as a guide.

The ring body according to the invention has a circumferential inner ring groove on a radial outer lateral surface. A piston ring is arranged in this inner ring groove.

To this end, the circumferential inner ring groove is designed to receive the piston ring and fix it in its axial position. Furthermore, the circumferential inner ring groove is designed to permit a radial movement of the piston ring at least to the extent that it can deform itself resiliently. This is achieved by a sufficient depth of the circumferential inner ring groove.

According to the invention, the piston ring rests resiliently against the inner cylinder wall and has a piston ring gap.

For this purpose, the piston ring is provided in a resilient, in particular radially elastic, design and in its relaxed state, it has an outer diameter that is larger than the inner diameter of the cylinder tube.

When the piston unit is inserted into the cylinder tube, the piston ring assumes a state of stress in the circumferential inner ring groove and rests against the inner cylinder wall. In this state of stress, the piston ring deforms elastically and reduces its outer diameter and the size of the piston ring gap.

According to the invention, the ring body receives a guiding pin of the piston main part in a ring opening and forms a ring gap between a radial inner lateral surface of the ring body and the guiding pin. The ring opening is preferably a hollow cylindrical recess. However, it may also have different geometries provided it is designed to be capable to be guided by the guiding pin. The ring body is designed such that it can be arranged with its ring opening on the guiding pin of the piston main part.

The guiding pin is a component of the piston main part. The guiding pin is preferably a tapered section of the piston main part. However, it can also be a connected component. The guiding pin is arranged at the end of the piston unit facing the end stroke to be damped. The guiding pin has preferably a cylindrical shape. Then, the outer diameter of the guiding pin is smaller than the inner diameter of the ring opening. However, the guiding pin can also have any other geometry which is suited to guide the ring body.

The solution according to the invention is particularly characterized in that the ring body has an axial play and a radial play with respect to the piston main part. Hereinafter, the ring body is also referred to as a floating ring body because of the radial play.

In its position on the guiding pin, the axial movement of the ring body is limited by means of a blocking element. The blocking element is preferably designed as a Seeger circlip ring, which is inserted in a corresponding ring groove arranged on the guiding pin. Other designs of blocking elements, which can be arranged on the piston main part and axially limit the play of the ring body, are also possible.

The ring body according to the invention has an axial ring surface on the piston main part side, and the piston main part has an opposed axial counter ring surface on the ring body side.

According to the invention, the piston unit is designed such that during an inward movement into the damping zone, the piston unit with the piston ring passes axially over the pressure medium connection and, in the damping zone, it encloses a damping pressure medium volume in a damping zone space.

When the piston ring passes over the pressure medium connection during the inward movement, it reaches the damping zone. At the same time, a damping pressure medium volume is enclosed. Now, the pressure medium can no longer flow out of the working chamber directly via the pressure medium connection.

The damping zone space defines the part of the cylinder interior that is limited by the piston unit, the closure part and the cylinder tube when the piston ring has passed over the pressure medium connection. The size of the damping zone space decreases when the piston unit continues its axial movement towards the axial end position.

The portion of the pressure medium that is enclosed in the damping zone space and flows out of it is referred to as the damping pressure medium volume.

The piston unit according to the invention is designed to have a first operating state within the damping zone during an inward movement and a second operating state within the damping zone during an outward movement. Hereinafter, the first operating state is also referred to as the damping operating state. The second operating state will also be referred to hereinafter as the outward movement operating state.

According to the invention, in the first operating state, the axial ring surface on the piston main part side and the axial counter ring surface on the ring body side are in contact with each other and form a seal plane.

During the inward movement, the damping pressure medium volume is enclosed by the piston unit so that, compared to the pressure at the pressure medium connection, the pressure in the damping zone space also increases.

According to the invention, in the damping operating state there is thus an overpressure of the damping pressure medium volume compared to the pressure at the pressure medium connection. Further, the piston ring gap according to the invention is configured for a throttled outflow of the damping pressure medium volume.

In the damping operating state, the pressure of the enclosed pressure medium, i.e., the damping pressure medium volume, exceeds the operating pressure existing in the remaining part of the working chamber so that the ring body is pressed with its axial ring surface on the piston main part side against the axial counter ring surface on the ring body side and forms a seal plane there. The operating pressure is understood to be the pressure of the pressure medium applied to the pressure medium connection, which corresponds to the pressure in the remaining part of the working chamber.

In the damping operating state, the pressure medium can only flow out through the piston ring gap. The deceleration of the outflow of the damping pressure medium volume produces a force effect that counteracts the inward movement of the piston unit.

According to the invention, an axial gap is formed between the axial ring surface on the piston main part side and the axial counter ring surface on the ring body side in the second operating state. Hereinafter, this axial gap between the axial ring surface on the piston main part side and the axial counter ring surface on the ring body side is also shortly called the axial gap.

This is based on the fact that in the outward movement operating state, the operating pressure is higher than the pressure of the damping pressure medium volume in the damping zone space. The ring body moves away from the axial counter ring surface of the piston main part on the ring body side, and an axial gap is formed between the piston main part and the ring body.

According to the invention, the axial gap and the ring gap form a pressure medium inlet channel. The pressure medium inlet channel is designed for an inflow of the pressure medium into the damping zone space.

In fact, an inflow of the pressure medium is also possible via the remaining cross section defined by the piston ring gap. However, particularly in the case of progressive damping with a conical cross section in the damping zone, the cross section of the piston ring gap may be so small that an active outward movement would be possible only with a very long delay then and, in addition, the considerable pressure loss across the piston ring gap would have to be overcome for this purpose.

The axial gap between the axial ring surface of the ring body on the piston main part side and the axial counter ring surface of the piston main part on the ring body side as well as the radial ring gap between the radial inner lateral surface of the ring body and the guiding pin form a pressure medium channel with a structurally designable cross section that allows the pressure medium to flow into the damping zone space independently of the cross section of the piston ring gap.

In this way, the piston unit is moved out of its end position and the damping zone without unwanted damping. Thus, the piston unit executes the outward movement.

In addition, it was surprisingly found that the outward movement can be initiated with virtually no delay due to the ring body and its axial play. This is based on the fact that the ring body is actively moved axially away from the piston main part when pressure is applied to the pressure medium connection. The force that causes this movement results from the surface area of the ring surface on the side of the piston main part and the pressure difference between the pressure at the pressure medium connection and the pressure of the damping pressure medium in the damping zone space. In its axial movement, the ring body is designed as a solid body and thus it is designed to displace a partial volume of the damping pressure medium in the damping zone space, as a result of which the pressure medium presses on the piston main part and the piston unit is displaced from the end position without delay. This initial phase of the outward movement operating state is indeed only provided until the piston ring body has reached the play end position of its axial play at the circlip. In this state, however, the axial gap is advantageously completely open so that the pressure medium can flow into the damping zone space via the pressure medium inlet channel, and thus an uninterrupted outward movement can be continued without any disadvantageous delay.

The working cylinder with cushioned end-stroke according to the invention has the following advantages in particular:

A surprisingly simple solution has been found to solve several technical problems at the same time by providing the floating ring body.

First, the ring body is decoupled from the exact radial position of the piston main part due to its floating bearing. In a way of self-adjustment, the ring body always exactly follows the inner cylinder wall in its radial position by means of the radially elastic piston ring. This applies in particular even if the piston main part is negatively influenced in its radial position, especially as a result of deformations of the piston rod under buckling loads.

Another advantage is that the ring body does not have to transmit any radial forces to the inner cylinder wall.

This also makes it possible to advantageously provide a particularly small gap size between the outer lateral surface of the ring body and the inner cylinder wall without the risk of rubbing against the inner cylinder wall, and this would not be possible according to the prior art.

It is also advantageous that a particularly precise cushioned end-stroke can be provided by means of the ring body and thus by one and the same component. The particular precision is based on the fact that the ring body in its radial position also follows the respective shape of the inner cylinder wall in the damping zone, which in this case can be a conical shape in particular.

In addition, with particularly little design effort, the floating ring body can also advantageously be provided with an axial play and thus two different operating states can be provided in the form of a damping operating state and an outward movement operating state, which on the one hand allow a precise damping effect during an inward movement and, on the other hand, allow to bypass damping during an active outward movement.

In addition, the cross section of the ring gap is advantageously always constant irrespective of the radial positional relationship of the ring body and the guiding pin within the radial play and can be defined in a simple manner by the difference between the inner diameter of the ring body and the outer diameter of the guiding pin.

It is also advantageous that the damping characteristic and the outward movement characteristic can be adapted to the specific requirements by simple structural means such as the selection of the axial spacing of the pressure medium connection, the shape of the inner cylinder wall in the damping zone, the width of the piston ring gap or the width of the radial gap and the ring gap. Moreover, this can be done separately for each end stroke, if applicable.

Moreover, it is advantageous that an outward movement can be provided without delay by means of the ring body and its axial play when it is designed as a solid body.

Furthermore, it is advantageous that cushioned end-stroke can be provided both in only one end position and in both end positions.

In addition, the solution can be used in different cylinder types, such as in particular differential working cylinders, synchronized cylinders, pull cylinders or plunger cylinders.

The elastic piston ring, which is tensioned against the inner cylinder wall, can also advantageously compensate for deviations of the cylinder tube caused by the manufacture, and thus high precision damping is made possible.

The constant distance between the ring body and the inner cylinder wall leads to the advantage that magnetic position sensors can be employed very reliably and provide precise axial position data of the piston unit.

Finally, particular advantages are the great robustness, the high operational reliability, and the technologically good manufacturability.

According to an advantageous further development, the axial play of the ring body is limited axially distally from the piston centre by a circlip.

For this purpose, the circlip is inserted in a groove of the guiding pin, although the circlip is not completely accommodated by the groove. The circlip can be, in particular, a Seeger circlip ring which is not expensive and available as a standard component.

Thus, the axial play of the ring body is limited by the axial counter ring surface of the piston main part in one direction and by the circlip in the other direction.

The advantage is that by means of a structurally very simple and at the same time reliable means, i.e., the axial distance of the circlip to the ring body, the axial play of the ring body and thus the possible width of the axial gap between the axial ring surface on the piston main part side and the axial counter ring surface on the ring body side can be defined as a section of the pressure medium inlet channel. In this way, the possible speed of the outward movement in the second operating state can also be specifically influenced.

According to a further developed embodiment, the guiding pin has an axial groove which is formed as a part of the pressure medium inlet channel here.

The axial groove is at least one groove that runs axially along with the guiding pin. The axial groove can also be formed by several grooves.

By means of the axial groove, the cross section of the ring gap can be widened in a simple manner and thus, in conjunction with the axial gap, it can be used advantageously for the selective adjustment of the pressure medium inflow in the second operating state. In this way, the achievable speed of the outward movement in the damping zone can be determined. The cross section of the pressure medium inlet channel can advantageously be enlarged by means of the axial groove, independently of the radial play of the ring body.

In accordance with an advantageous further development, the cylinder has a position sensor. The position sensor is designed to record a position of the ring body.

The position sensor detects the position of the piston unit by means of a measuring method that registers and evaluates a capacitive, magnetic, mechanical or electromagnetic change in properties during the piston movement. Various position sensors for determining the piston position are known from the prior art. For example, a reed switch can be employed for detection purposes in the case of a magnetic design.

This further development is particularly advantageous because an extremely precise position detection can be provided. This precision is based on the fact that the ring body is mounted with radial play, i.e., in a floating design, relative to the piston main part. The exact radial position of the ring body relative to the cylinder tube remains unaffected by radial position inaccuracies of the piston main body, which can occur in particular as a result of buckling loads, dynamic loads, or uneven wear of the guide, because the ring body is guided directly by the inner cylinder tube wall via the piston ring. This means that there is always an exact gap size between the ring body and the inner cylinder wall and, moreover, the gap size can be provided in a considerably smaller design compared to the prior art. The position sensor is arranged in a fixed position relative to the cylinder tube. It has been found that the reliable radial distance between the ring body and the position sensor can significantly increase the accuracy of the axial position detection.

According to another further development, the inner cylinder wall is tapered in the damping zone and, in the first operating state, the piston ring is designed to narrow the piston ring gap with the progressive inward movement.

If the inner cylinder wall is tapered in the damping zone, the piston ring is increasingly tensioned during the inward movement, as its outer diameter has to adapt to the increasingly smaller inner diameter of the inner cylinder wall. This also progressively reduces the piston ring gap, and the cross section for the outflow of the damping pressure medium volume decreases.

Thus, the damping effect of the damping zone increases to a maximum. And the level of the taper determines the increase in the damping effect according to the inward movement path covered.

However, the inner cylinder wall can also have a conical section at the beginning and then again a cylindrical section in the damping zone along with the inward movement. In this case, the damping effect is increased to a maximum in the conical section, whereas in the following cylindrical section of the damping zone the maximum damping effect achieved continues to be effective until the end position is reached. Hence, the course of the damping effect can also be adapted to specific requirements.

In accordance with an advantageous further development, the cylinder has a further damping zone in a further end region axially opposite the end region.

According to this advantageous further development, the cylinder has a further laterally arranged pressure medium connection, wherein the further pressure medium connection is assigned to the further damping zone and is axially spaced from a further axial boundary of the cylinder interior opposite the axial boundary.

The function and design of the further pressure medium connection, the further damping zone and the further axial boundary basically correspond to the function and design of the pressure medium connection, the damping zone and the axial boundary.

The further damping zone and the further pressure medium connection are arranged in spatial proximity to the second closure part at the second cylinder tube end.

According to the advantageous further development, the piston unit has a further ring body positioned axially opposite the ring body, and the piston main body has a further guiding pin positioned axially opposite the guiding pin.

The further ring body is designed analogously to the ring body and is arranged on the opposite side of the piston unit. The further guiding pin also has at least one further blocking element which limits the axial play of the further ring body. Preferably, this further blocking element is also designed as a further circlip which is inserted into a further groove in the further guiding pin.

The dimensions of the further ring body and the further guiding pin may differ from those of the ring body and the guiding pin despite their basically identical design. For example, different damping characteristics can be implemented at the two end positions of the piston unit. This is particularly useful for a working cylinder that is subject to strong asymmetric loads.

In accordance with the advantageous further development, the piston unit is designed to have a third operating state during an inward movement within the further damping zone and a fourth operating state during an outward movement within the further damping zone. Hereinafter, the third operating state is also referred to as the further damping operating state. And the fourth operating state is also referred to hereinafter as a further outward movement operating state.

The third operating state is also referred to as the further damping operating state and correspondingly exhibits the features of the first operating state with respect to the further damping zone. The fourth operating state is also referred to as the further extension operating state and correspondingly exhibits the features of the second operating state with respect to the further damping zone.

The features of the operating states are to be understood to be in particular the pressure ratios, the positions of the ring body and the further ring body relative to the piston main part, and the positional relationships of the piston unit to the pressure medium connection and to the further pressure medium connection.

The particular advantage of the further development specified above is that cushioned end-strokes which are effective in both end positions are also provided for double-acting working cylinders.

In addition, it is advantageous that the damping characteristic in each of the two cushioned end-strokes can be adjusted independently of that of the respective other cushioned end-stroke.

The invention is described as an exemplary embodiment in more detail by means of the following figures. They show:

DETAILED DESCRIPTION OF THE INVENTION

Figure 1:
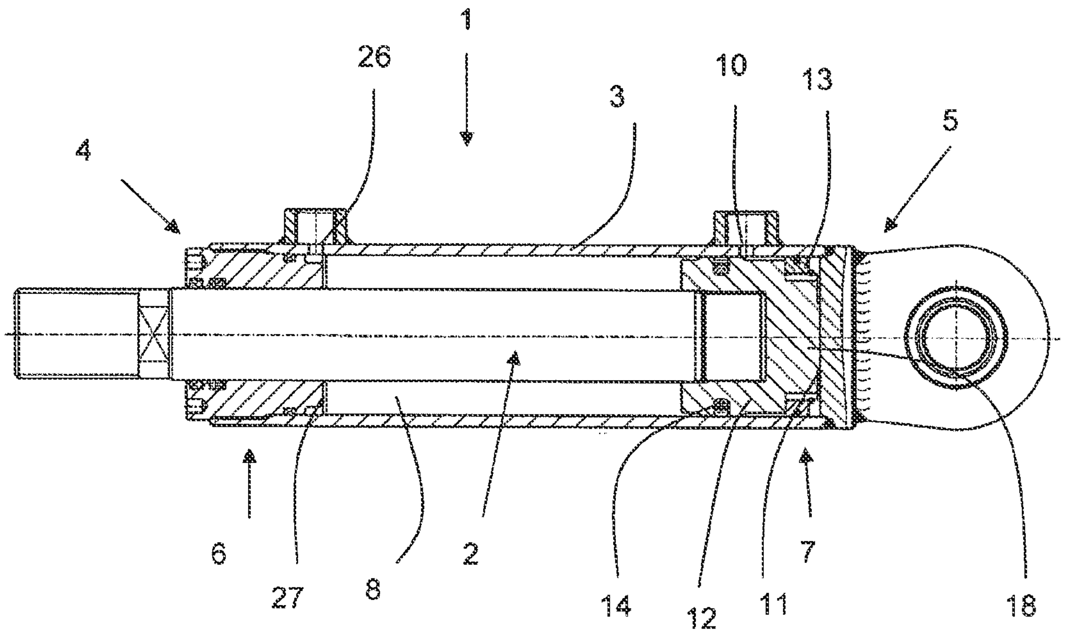
FIG. 1 Working cylinder with cushioned end-stroke as a differential cylinder with cushioned end-stroke on one side (sectional view)

FIG. 1 shows an overview of a first embodiment of the differential working cylinder with cushioned end-stroke. In this embodiment, it is a differential working cylinder with cushioned end-stroke on one side. In this embodiment, the cushioned end-stroke is provided at the end position associated with the second closure part 5. It is a cushioned end-stroke at the piston crown which damps the inward movement.

The working cylinder with cushioned end-stroke has a cylinder 1 and a piston unit 2.

The cylinder 1 consists of the cylinder tube 3, the first closure part 4 and the second closure part 5. The cylinder tube 3 and the two closure parts 4, 5 are connected to each other in such a way that they enclose a cylinder interior 8. The first closure part 4 is associated with the first cylinder tube end 6, and the second closure part 5 is associated with the second cylinder tube end 7. In this embodiment, the inside of the second closure part 5 forms an axial boundary 11, and the inside of the first closure part 4 forms a further axial boundary 27 which limits the axial movement space of the piston unit 2 arranged in the cylinder interior space 8. The axial boundaries 11, 27 are designed as stop surfaces for the piston unit 2 which moves axially during operation.

On the cylinder tube 3, the pressure medium connection 10 is arranged at the second cylinder tube end 7, and the further pressure medium connection 26 is arranged on the first cylinder tube end 6.

The piston unit 2 has a piston main part 12 and a ring body 13. In the exemplary embodiment, the piston unit 2 is composed of a piston rod and a piston, which are firmly connected to each other. In the embodiment, the piston main part and the ring body together form the piston.

In this embodiment, the piston rod of the piston unit 2 is guided through the first closure part 4 and slidably mounted therein.

The ring body 13 is pushed onto the guiding pin 18, which is designed as a taper on the piston main part 12.

The piston main part 12 is guided in the cylinder tube 3 by means of a guide 14.

Figure 2:
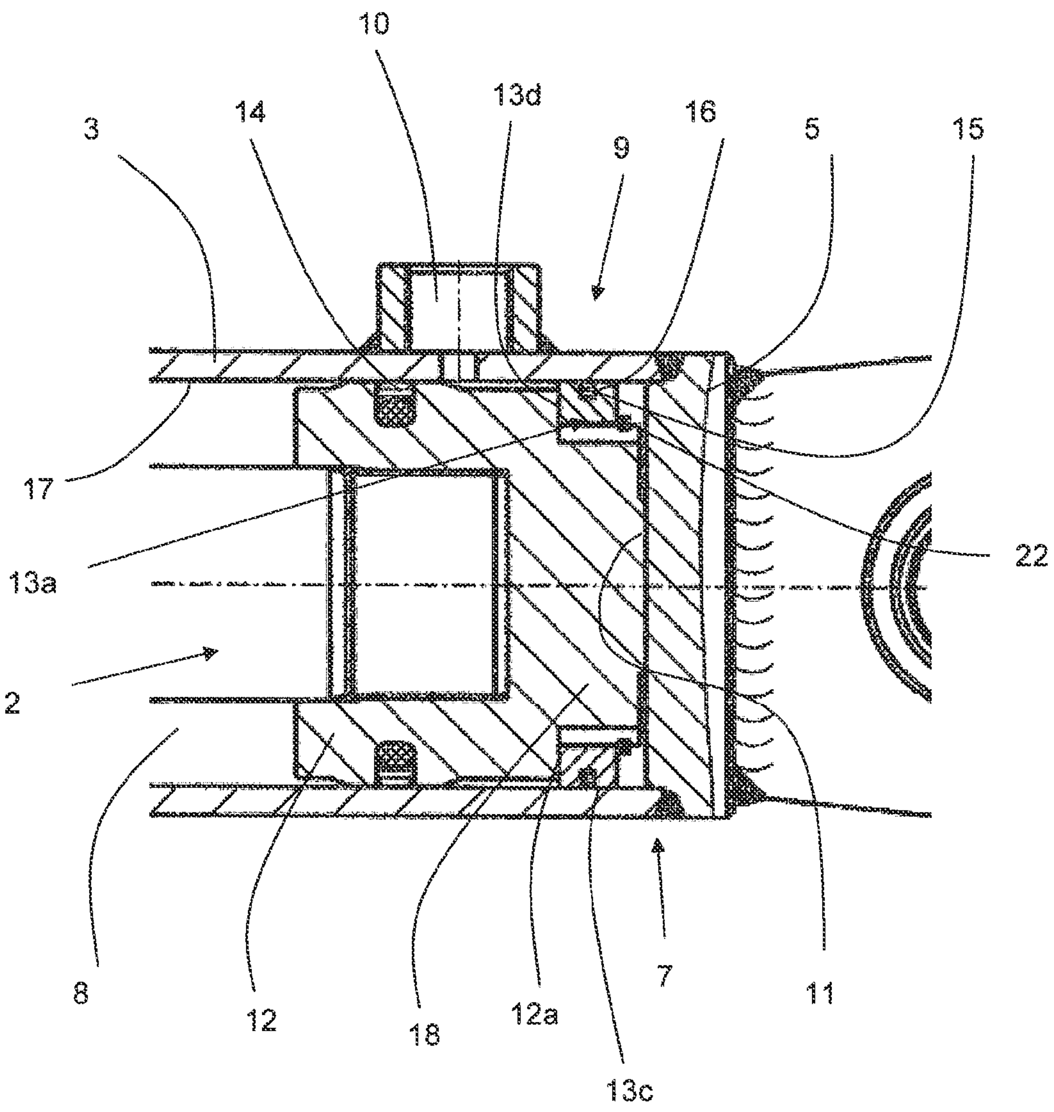
FIG. 2 Working cylinder with cushioned end-stroke as a differential cylinder with cushioned end-stroke on one side (enlarged detail in sectional view)

FIG. 2 shows an enlarged detail of FIG. 1 in the area of the second closure part 5. Furthermore, the piston main part 12 is in an end position so that the piston main part 12 rests with its guiding pin 18 against the axial boundary 11.

In this Figure, the arrangement and design of the ring body 13 are shown in more detail. In this embodiment, the ring body 13 is designed as a metal ring which has an inner ring groove 15 on its outer lateral surface 13*c*, in which the piston ring 16 is inserted. The inner ring groove 15 is designed such that the piston ring 16 has a larger play in the radial direction so that it can deform elastically in the radial direction. The elastic piston ring has a piston ring gap 16*a* (see FIG. 7 in particular) and is tensioned against the inner cylinder wall 17.

The ring body 13 is pushed onto the guiding pin 18 and rests with an axial ring surface on the piston body side 13*d* against the counter ring surface on the ring body side 12*a* of the piston main part 12. Axially opposite, the axial play of the ring body 13 is limited by a circlip 22.

Furthermore, the ring opening 13*a* of the ring body is designed in such a manner that it exceeds the diameter of the guiding pin 18 so that the ring body has a radial play with respect to the guiding pin 18.

The damping zone 9 is an axial section and extends from the pressure medium connection 10 to the end position of the piston ring 16 in front of the second closure part 5. The inner cylinder wall has a taper 9T in the damping zone 9 and, in the first operating state, the piston ring 16 is constructed to narrow the piston ring gap 16*a* with the progressive inward movement. When the piston unit 2 moves inward, a damping effect is caused in the damping zone 9 and is directed opposite to the inward movement of the piston unit 2 and slows it down. This is described in more detail in conjunction with FIG. 5.

Figure 3:
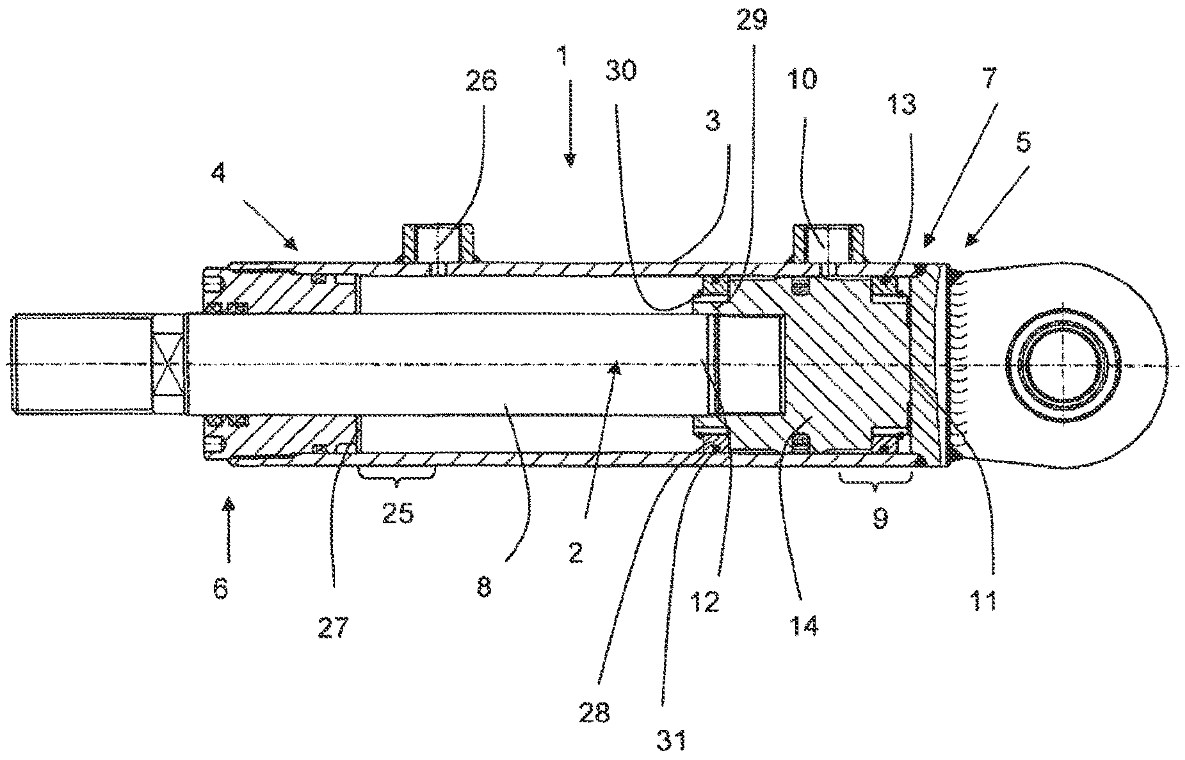
FIG. 3 Working cylinder with cushioned end-stroke as a differential cylinder with cushioned end-stroke on both sides (sectional view)

FIG. 3 shows a second embodiment. This is a differential working cylinder with cushioned end-stroke in both end positions. For this purpose, an additional ring body 28 is provided. The further ring body 28 has a design identical to that of the ring body 13 and is pushed onto a further guiding pin 29 and fixed there by a further circlip 30. Both ring bodies 13, 28 and both guiding pins 18, 29 are positioned axially opposite each other on the piston main part 12.

The further ring body additionally produces a damping effect in the further damping zone 25 correspondingly to the damping zone 9. The further damping zone 25 extends between the further pressure medium connection 26 and the end position of the further piston ring 31 in front of the further axial boundary 27 at the first closure part 4.

Moreover, the differential working cylinders in FIG. 1 and FIG. 3 have an identical basic design.

Figure 4:
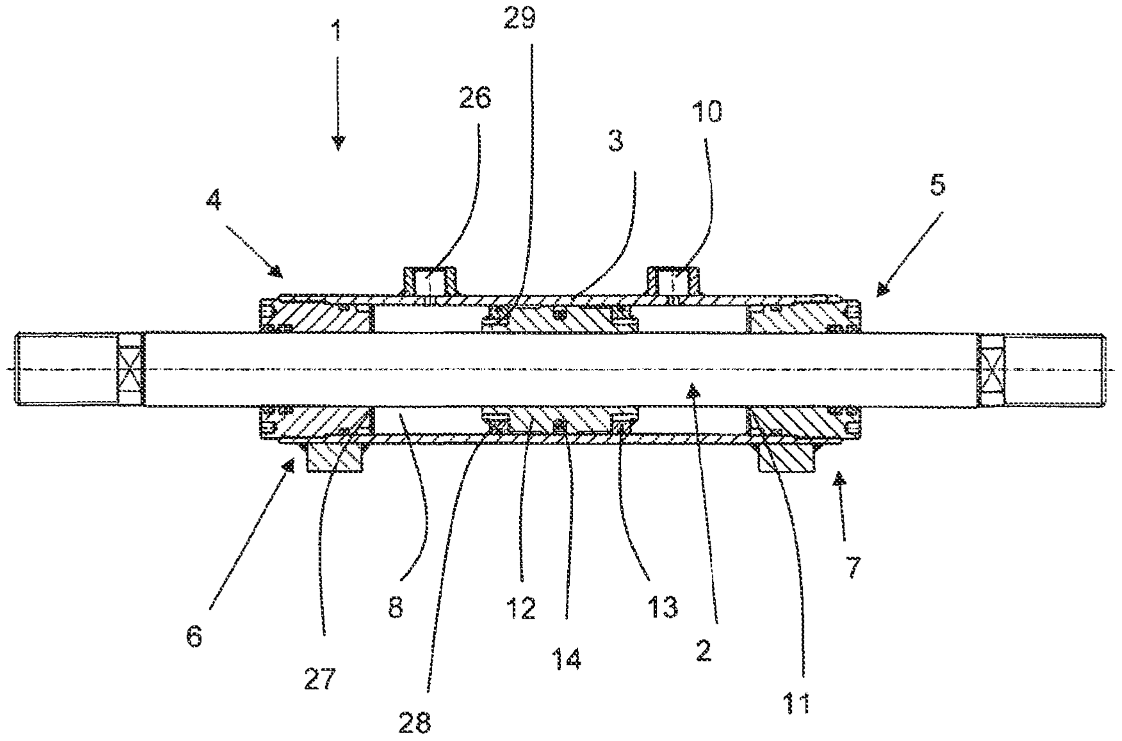
FIG. 4 Working cylinder with cushioned end-stroke as a synchronized cylinder with cushioned end-stroke on both sides (sectional view)

FIG. 4 shows a synchronized working cylinder that has also cushioned end-strokes on both sides. The difference to the differential working piston in FIG. 3 is that the piston rod section of the piston main part 12 is guided through both closure parts 4, 5 and slidably mounted. Therefore, the second closure part 5 is also designed as a guide closure part in this embodiment. The piston main part 12 is similarly designed to that in FIG. 3, however, it differs in that the piston rod passes through it. Also here, both sections of the piston unit 2 are firmly connected to each other.

Figure 5:
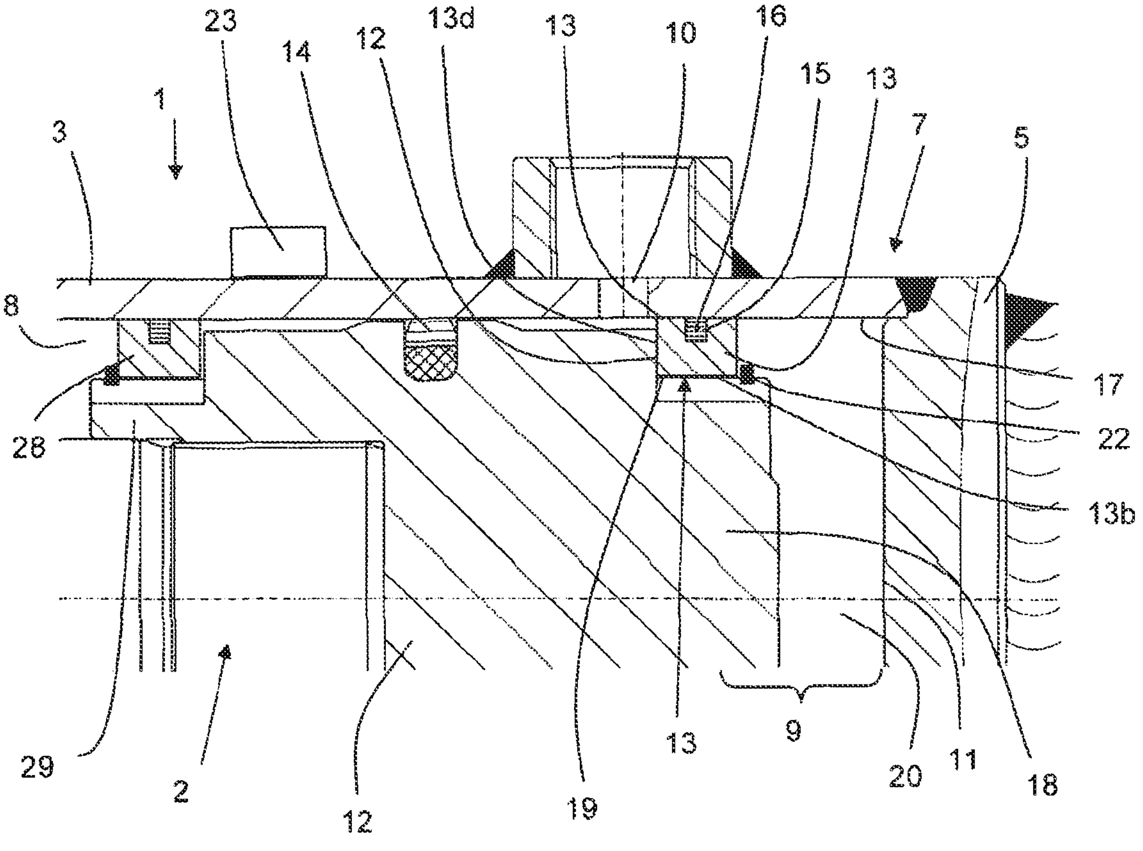
FIG. 5 Working cylinder with cushioned end-stroke as a differential cylinder with cushioned end-stroke on both sides in the first operating state (enlarged detail in sectional view)
Figure 6:
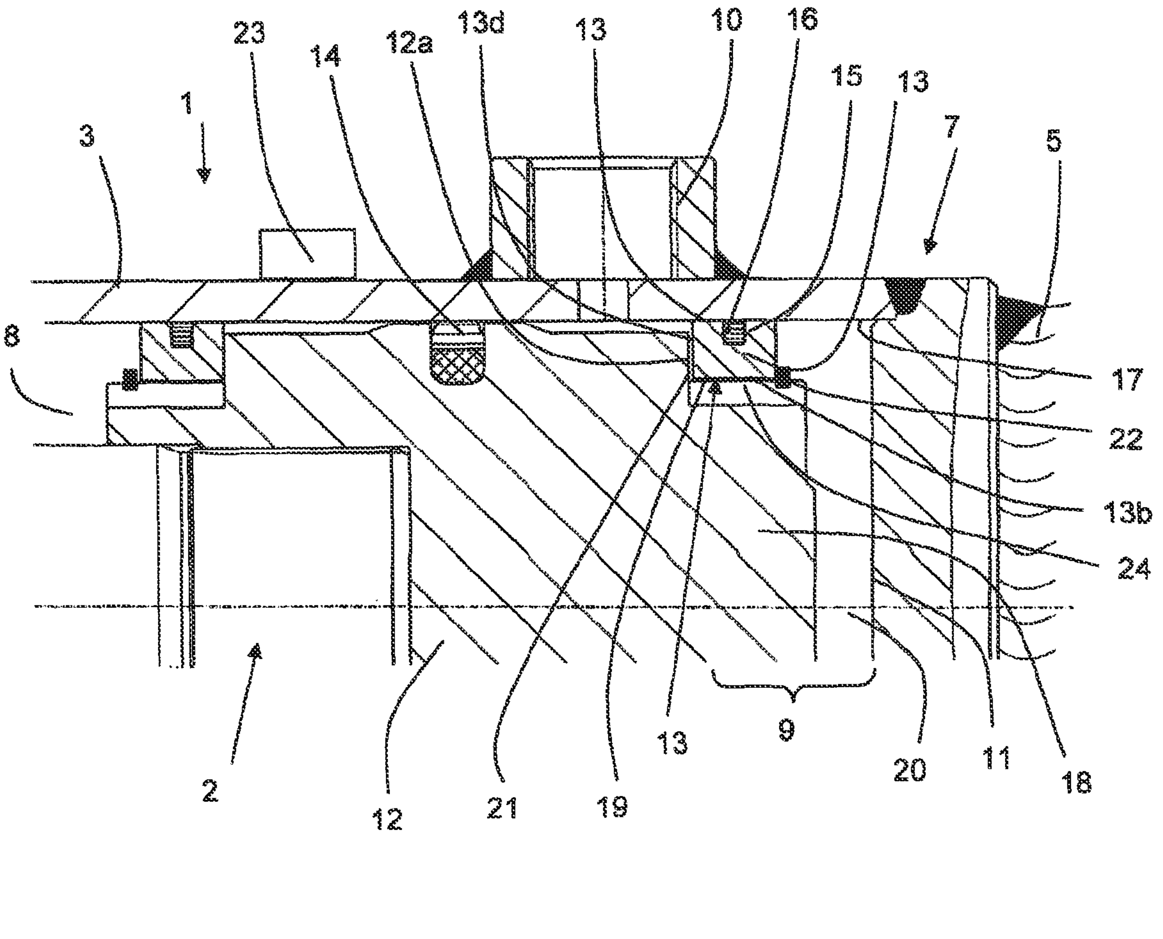
FIG. 6 Working cylinder with cushioned end-stroke as a differential cylinder with cushioned end-stroke on both sides in the second operating state (enlarged detail in sectional view)

In FIG. 5, the first operating state, which is the damping operating state, and in FIG. 6, the second operating state, which is the outward movement operating state are shown during the operation of the working cylinder with cushioned end-stroke. These Figures are used to illustrate the manner in which damping functions.

In FIG. 5, the piston unit executes an inward movement, and the piston ring 16 in the inner ring groove 15 of the ring body 13 has just passed over the pressure medium connection 10 and encloses a damping pressure medium volume in the damping zone space 20. The pressure in the damping pressure medium volume is greater than the pressure at the pressure medium connection 10. Consequently, the ring body 13 is pressed with its axial ring surface on the piston main part side 13*d* against the axial counter ring surface on the ring body side 12*a* so that an annular sealing plane is formed there.

The pressure medium from the damping pressure medium volume can now only flow back to the pressure medium connection 10 via the piston ring gap 16*a* in the piston ring 16, and thus the inward movement of the piston unit 2 is counteracted by a damping force effect. The inward movement is slowed down until the piston unit 2 reaches the axial boundary 11.

FIG. 6 shows the second operating state.

In this second operating state, the piston unit 2 executes an outward movement. This movement is caused by the pressure medium flowing from the pressure medium connection 10 into the damping zone space 20 (as soon as the pressure at the pressure medium connection 10 is greater than that in the damping pressure medium volume).

As soon as the pressure at the pressure medium connection 10 is greater than that in the damping pressure medium volume, the ring body 13 is displaced axially and pressed against the circlip 22. As a result, an axial gap 21 between the axial counter ring surface on the ring body side 12*a* and the axial ring surface on the piston main part side 13*d* is opened.

Moreover, the ring body 13 has a radial play. This is provided by a ring gap 19 between the inner lateral surface 13*b* and the guiding pin 18. The axial gap 21 and the ring gap 19 form a continuous pressure medium inlet channel for the pressure medium flowing into the damping zone space 20. In this embodiment, an axial groove 24 in the guiding pin additionally enlarges the flow cross-section of the pressure medium inlet channel.

This allows the pressure medium to flow into the damping zone space 20 with low pressure loss and the outward movement is hardly slowed down.

In an embodiment with cushioned end-stroke on both sides, the mode of operation shown in FIGS. 5 and 6 corresponds to the interaction of the third and fourth operating states in the further damping zone 25 by means of the further ring body 28.

The piston unit is in the third operating state during the inward movement into the further damping zone 25, and in the fourth operating state during the outward movement out of the further damping zone 25. In the further end position, the third operating state is the damping operating state and the fourth operating state is the outward movement operating state.

In addition, FIG. 5 and FIG. 6 show a position sensor 23 arranged on the cylinder tube.

Figure 7:
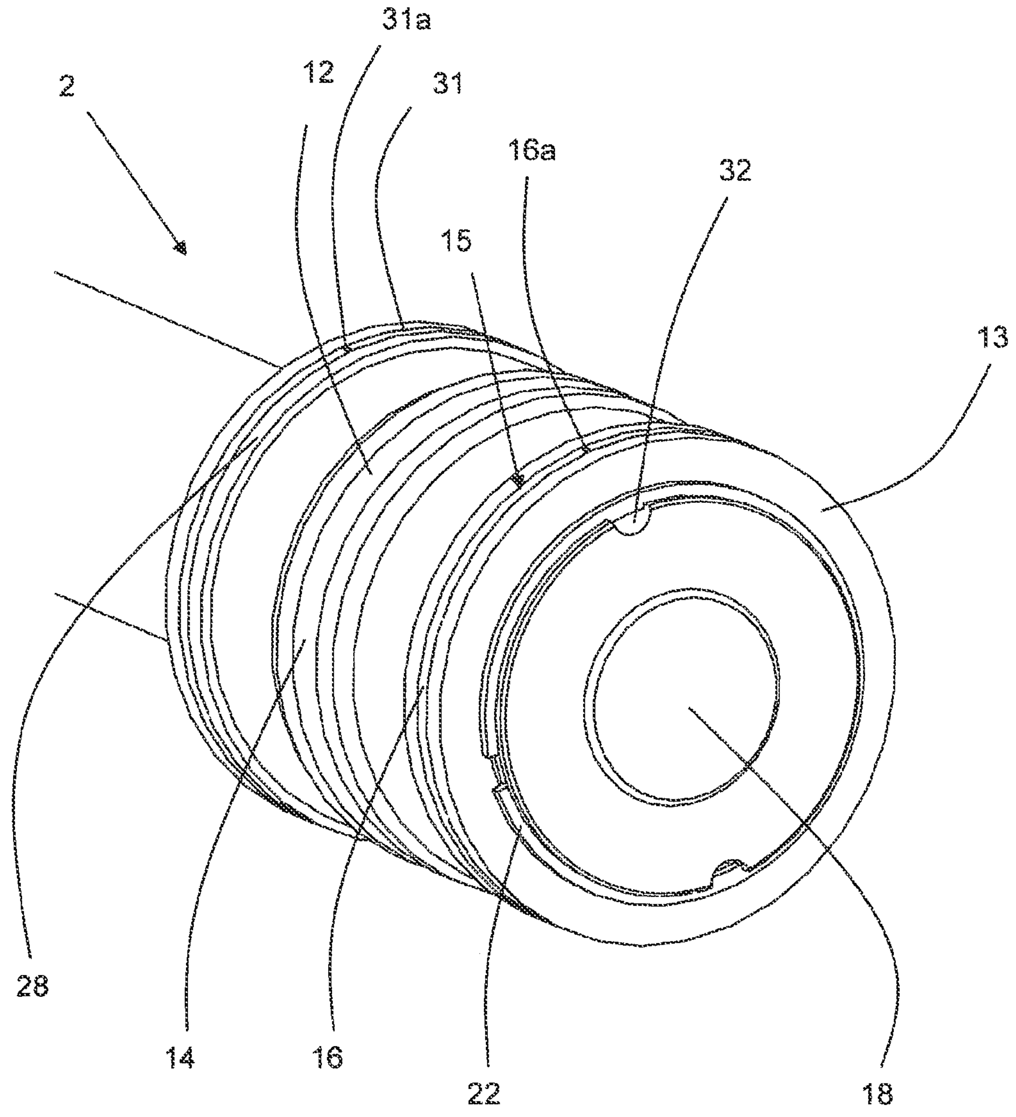
FIG. 7 Piston unit (isometric view).

FIG. 7 shows the piston unit 2 of an embodiment of a differential working cylinder with cushioned end-stroke on both sides in an oblique view.

The ring body 13, the piston ring 16 with its piston ring gap 16*a*, the circlip 22, the guide 14 and the axial groove 24 are shown. Furthermore, axially opposite the piston main part, 12 the further ring body 28 and the further piston ring 31 arranged there with its further piston ring gap 31*a* are shown. The piston rings 16, 31 and the circlip 22 are each designed as an elastic metal ring. The further circlip and the further guiding pin are hidden and, therefore, they do not have reference numerals in FIG. 7.

The ring body 13 receives the piston ring 16 in the inner ring groove 15 and is fixed on the guiding pin 18 by the circlip 22. The same applies to the further ring body 28 and the further piston ring 31 as well as the further circlip and the further guiding pin.

The guide 14 is arranged in a groove of the piston main part 12.

REFERENCE NUMERALS

1 cylinder
2 piston unit
3 piston tube
4 first closure part
5 second closure part
6 first cylinder tube end
7 second cylinder tube end
8 cylinder interior
9 damping zone
10 pressure medium connection
11 axial boundary
12 piston main part
12*a* axial counter ring surface on the ring body side
13 ring body
13*a* ring opening
13*b* inner lateral surface
13*c* outer lateral surface
13*d* axial ring surface on the piston main part side
14 guide
15 inner ring groove
16 piston ring
16*a* piston ring gap
17 inner cylinder wall
18 guiding pin
19 ring gap
20 damping zone space
21 axial gap
22 circlip
23 position sensor
24 axial groove
25 further damping zone
26 further pressure medium connection
27 further axial boundary
28 further ring body
29 further guiding pin
30 further circlip
31 further piston ring
31*a* further piston ring gap

The invention claimed is:

1. A working cylinder with cushioned end-stroke, comprising:

a cylinder having a cylinder tube with an inner cylinder wall, a first closure part and a second closure part, the cylinder tube having a first cylinder tube end and a second cylinder tube end, the first closure part being arranged at the first cylinder tube end and the second closure part being arranged at the second cylinder tube end, the cylinder tube and the closure parts defining a cylinder interior with an axial boundary, the cylinder having a damping zone at one of the tube ends, the cylinder having at least one laterally arranged pressure medium connection associated with the damping zone and being axially spaced the axial boundary;

a piston unit having a piston main part with a guiding pin, the piston unit having a ring body with a radial outer lateral surface, a ring opening, and a piston main part side with an axial ring surface and, opposite said axial ring surface, the piston main part having an axial counter ring surface on a ring body side thereof, the ring body having a circumferential inner ring groove on the radial outer lateral surface, the ring body receiving the guiding pin in the ring opening;

a ring gap being defined between a radial inner lateral surface of the ring body and the guiding pin, the ring body having an axial play and a radial play with respect to the piston main part, the piston unit slidingly passing through the first closure part and defining at least one working chamber in the cylinder interior, the piston main part being guided in an axially displaceable manner by a guide in the cylinder interior;

a piston ring disposed in the inner ring groove, the piston ring resting resiliently against the inner cylinder wall and having a piston ring gap;

the piston unit constructed for axially passing over the pressure medium connection with the piston ring during an inward movement into the damping zone and enclosing a damping pressure medium volume in a damping zone space in the damping zone, the piston unit constructed for being in a first operating state within the damping zone during inward movement and in a second operating state during outward movement;

in the first operating state, the axial ring surface and the axial counter ring surface abutting against each other and defining a sealing plane, the damping pressure medium volume having an overpressure compared to the pressure medium connection, and the piston ring gap being configured for a throttled outflow of the damping pressure medium volume;

in the second operating state, an axial gap exists between the axial ring surface and the axial counter ring surface, the axial gap and the ring gap defining a pressure medium inlet channel configured for an inflow of a pressure medium into the damping zone space.

2. The working cylinder with cushioned end-stroke according to claim 1, wherein the axial play of the ring body is limited axially by a circlip.

3. The working cylinder with cushioned end-stroke according to claim 1 wherein the guiding pin has an axial groove which defines a part of the pressure medium inlet channel.

4. The working cylinder with cushioned end-stroke according to claim 1, wherein the cylinder includes a position sensor configured to record a position of the ring body.

5. The working cylinder with cushioned end-stroke according to claim 1, wherein the inner cylinder wall is tapered in the damping zone and, in the first operating state, the piston ring is constructed to narrow the piston ring gap when inward movement progresses.

6. The working cylinder with cushioned end-stroke according to claim 1, comprising a second damping zone axially opposite the first damping zone, the cylinder including a second laterally arranged pressure medium connection, the second pressure medium connection being associated with the second damping zone and being axially spaced from a second axial boundary of the cylinder interior opposite the axial boundary;

the piston unit including a second ring body axially opposite the ring body, the piston main part having a second guiding pin axially opposite the guiding pin;

during an inward movement into the second damping zone, the piston unit constructed for axially passing over the second pressure medium connection with a second piston ring and enclosing a further damping pressure medium volume in a second damping zone space in the second damping zone.

* * * * *